UNITED STATES PATENT OFFICE.

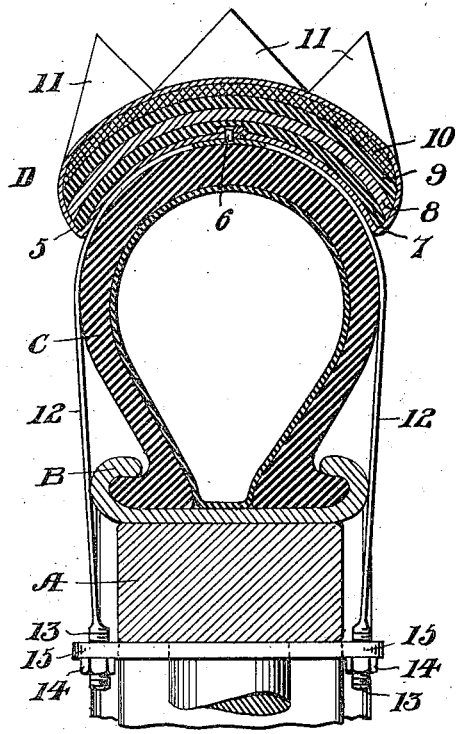
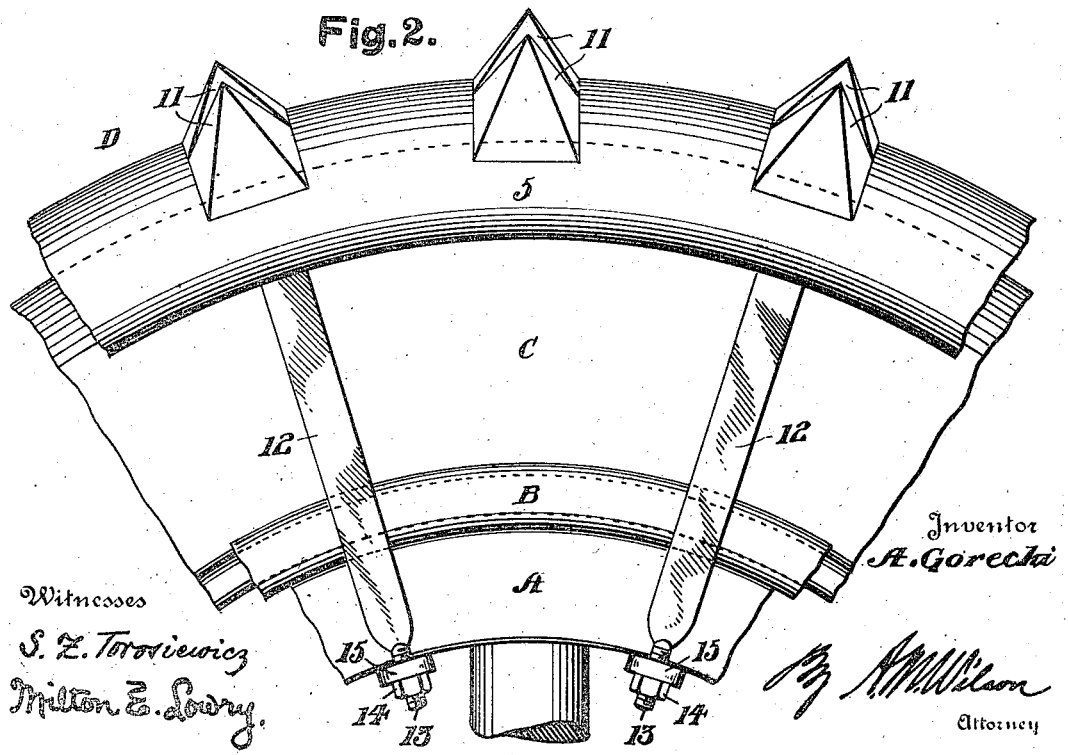

ANTONI GORECKI, OF BUFFALO, NEW YORK.

ANTISKID ATTACHMENT FOR TIRES.

1,140,590. Specification of Letters Patent. Patented May 25, 1915.

Application filed February 10, 1915. Serial No. 7,286.

*To all whom it may concern:*

Be it known that I, ANTONI GORECKI, a subject of the Emperor of Austria-Hungary, residing at Buffalo, in the county of Erie and State of New York, have invented certain new and useful Improvements in Antiskid Attachments for Tires, of which the following is a specification.

This invention relates to certain new and useful improvements in anti-skid attachments for tires.

An object of the present invention is to provide an anti-skid attachment for tires that is positioned on the tire shoe spaced outwardly of the transverse medial line of the tire and is provided with fastening means engaging the wheel felly for securing the same in position on the tire.

A further object of the invention is to provide an anti-skid attachment for tires that is positioned to cover only substantially the tread portion of the tire shoe and which attachment carries fastening means for securing the same to the tire.

With the above objects in view and others that will appear as the nature of the invention is better understood, the same consists in the novel combination and arrangement of parts to be hereinafter more fully described, illustrated in the accompanying drawings, and pointed out in the appended claims.

In the drawings forming a part of this application and in which like designating characters refer to corresponding parts throughout the several views, Figure 1 is a cross-sectional view of the tire and my improved anti-skid attachment secured in position thereon. Fig. 2 is a side elevational view of a portion of the same.

Briefly described, the present invention aims to provide an anti-skid attachment and protector for pneumatic tires and includes a metal shield adapted to contain alternate layers of rubber and leather and an outwardly disposed layer of canvas with means for fastening the inner edges of the metal shield together, and to the fastening means for mounting the same on the tire with antiskidding devices or points carried by the outer face of the metal shield. By disposing the anti-skid protector outwardly of the transverse medial line of the tire, it is possible to accommodate a slight lateral movement of the shield with respect to the supporting tire and this lateral movement is limited by the fastening means.

Referring more in detail to the accompanying drawing, the reference letter A designates a wheel felly carrying the usual channel tire support B and pneumatic tire C with the improved anti-skidding attachment D secured thereon.

The anti-skidding attachment D specifically includes a shield preferably formed of thin sheet metal and having its inner end overlapped as shown in Fig. 1 and secured together by rivets designated 6. The inner and outer walls of the metal cover 5 are spaced apart and receive alternate layers of rubber 7, leather 8, rubber 9, and an outer covering of canvas 10. The covering 10 of canvas is disposed to engage the inner face of the metal shield 5, and this combination of layers affords additional resiliency to the tire and in no manner lessens the cushioning properties thereof. The outer face of the shield 5 is provided with alined ground-engaging calks 11 which may be secured to the shield in any suitable manner.

The fastening means for securing the anti-skidding section D to the tire C includes a metal band 12 which is curved coincident to the curvature of the tire and is engaged by the rivet 6 for holding in substantially immovable relative position the section D and the said band. It is to be noted that the metal bands 12 are provided with flat side faces for engaging the tire C and will in no manner mutilate the same. Each of the inner ends of the band 12 is changed to be circular in cross-section and is threaded as at 13 for the reception of fastening nuts 14, which nuts are adapted to engage the retaining cross arms 15 to bind the same and cause the section D to positively engage the tire. This anti-skidding member D may be formed to entirely cover the tire C or may be constructed of shorter elements to be disposed in spaced relation around the periphery of the tire.

While I have shown and described the preferred embodiment of the present invention, I do not wish to confine myself to the exact details of construction shown, as various forms, modifications and arrangement of the parts as shown may be had without departing from the spirit and scope of the invention as claimed.

What I claim as new is:—

1. An anti-skidding attachment for tires comprising a shield formed of a thin metal plate having its inner edges overlapping, fastening means for the overlapping ends of said shield, layers of cushioning material between the walls of the shield, and fastening means carried by the shield for engaging the wheel felly.

2. In a device of the class described, a shield formed of metal bent to have its opposite edges overlapped and providing spaced inner and outer walls, alternate layers of rubber and leather disposed between the walls of said shield, a layer of canvas disposed to contact the inner face of the outer wall, a band disposed on the tire and engaged by the aforesaid fastening means, and retaining means for the inner end of the band.

3. In a device of the class described, a shield section formed of metal and bent to provide spaced inner and outer walls, outwardly directed calks carried by the outer wall, cushioning means within said shield, and means for securing the shield to the tire.

In testimony whereof I affix my signature in presence of two witnesses.

ANTONI GORECKI.

Witnesses:
STEPHAN NOWICKI,
HARRISTON PANEK.